Apr. 24, 1923.  1,452,871
K. DIENST
PROCESS FOR STERILIZING FLOUR AND GRITS MADE FROM CEREALS
Filed April 19, 1921
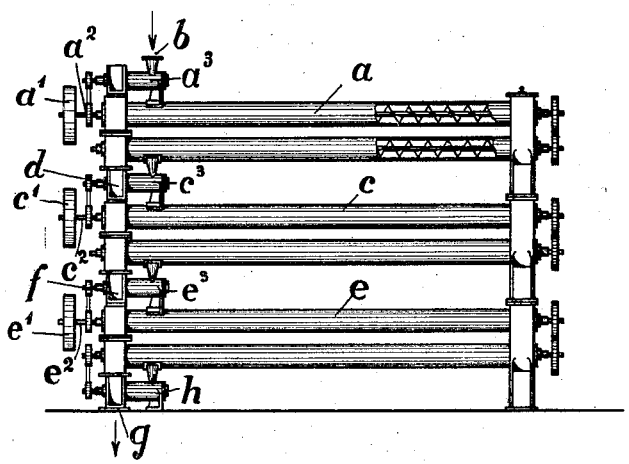
Inventor.
Karl Dienst Patented Apr. 24, 1923.

1,452,871

UNITED STATES PATENT OFFICE.

KARL DIENST, OF CHARLOTTENBURG, NEAR BERLIN, GERMANY.

PROCESS FOR STERILIZING FLOUR AND GRITS MADE FROM CEREALS.

Application filed April 19, 1921. Serial No. 462,779.

(GRANTED UNDER THE PROVISIONS OF THE ACT OF MARCH 3, 1921, 41 STAT. L., 1313.)

*To all whom it may concern:*

Be it known that I, KARL DIENST, a citizen of the Republic of Germany, of 23 Schilerstrasse, Charlottenburg, near Berlin, Germany, have invented certain new and useful Improvements in Processes for Sterilizing Flour and Grits Made from Cereals (for which an application for patent was filed in Germany May 11, 1917, Patent No. 335,406), of which the following is a specification.

The process for sterilizing and increasing at the same time the baking quality of the flour is based on the combination of two known methods, which are preferably carried out in continuous working under vacuum by continuously agitating the flour, that is to say, drying the flour or the like under vacuum at a low temperature and heating it up to 80° C. and more for the purpose of sterilization on the one hand, and subjecting the sterilized flour or the like to a sudden and strong cooling under vacuum from 80 degrees centigrade to zero or lower yet, for the purpose of increasing its baking capacity.

It is known to dry the flour, in order to render it stable, under vacuum at a low temperature, and to subject such dry flour to a higher temperature, to about 80 degrees centigrade and more for the purpose of sterilization, without interfering with its baking quality.

Besides, processes are known, in which by heating flour not previously dried with or without the addition of further moisture the baking quality of the flour is to be increased. By means of the methods just referred to the grains of starch of a certain part of the flour are said to be burst, and by adding this flour, which is no longer capable of being baked, to other flour, the mixture thus obtained is rendered more capable of absorbing water for the baking process.

According to another process, by likewise heating flour that is not previously dried, and suddenly cooling it down by about 40 degrees centigrade, physical-chemical and colloid-chemical changes are caused in the flour, in order to increase its baking quality.

Furthermore, trials in cool storage of flour not previously dried have shown, that the baking quality of the latter is increased in consequence of changes of a colloid-chemical nature caused by the action of the cold.

However, with none of the processes referred to in the premises a sterilization and an increase of the baking capacity was attained.

If, according to the present invention, flour or the like, which has been dried under vacuum, that is to say, at a low temperature, and then heated to such high temperatures, that a sterilization without changing the baking quality is warranted; is subjected to a sudden cooling process under vacuum, a decomposition of the particles of the flour takes place to such an extent, that the individual grains of starch are laid open to a large degree, the intermediate layer of gluten becoming brittle at the same time. This will promote both the capacity of absorbing water when preparing the dough and also the enzymic action during fermentation. It is important that the cooling following the heating is likewise effected under vacuum without the previous admission of atmospheric air, since otherwise the dried material still being warm, would at once absorb moisture contained in the atmospheric air, which again would render the gluten tough and capable of binding, in which case the intended looseness of the grains of starch would be prevented. For the purpose of a rapid and complete action of the heating and cooling medium the material to be treated must be constantly agitated during the heating and cooling process.

Changes of a chemical or colloid-chemical nature, as they are said to take place in the two methods described last, are excluded in the present process.

What has been remarked in respect of flour in the premises will accordingly apply to grits made from cereals.

The process according to the present invention is carried out in the following manner:

The flour or the like to be treated, for instance, is dried in a horizontal vacuum cylinder of known construction having a rotating drum, or in a vacuum receptacle having an agitating arrangement, which are capable of being heated by steam or hot water; or in a disc dryer of known construction provided with a vertical cylindrical mantle (for the purpose of attaining a vacuum), at about 45 degrees centigrade and a corresponding vacuum of 68–70 centimetres of mercury-column for about half an hour. By stopping the vacuum-pumps or by conveying the material to be dried under maintenance of the vacuum to a similar apparatus which is heated and connected airtightly with the first apparatus, it is possible to heat the dried material to 80 degrees centigrade and more within a few minutes. Although the material may be subjected to such heating for a long period, without prejudicing its baking quality, 10 to 15 minutes' time will suffice for sterilizing it. Preferably the sudden cooling is not effected in the same apparatus that serves for heating, since it would be damaged in consequence of the rapid variation in temperature, consequently the material must be conveyed to a separate cooled apparatus under vacuum. For this purpose, for instance, a receptacle is in air-tight connection with the heating apparatus, said receptacle being provided with an agitating device and cooling jacket, and capable of being evacuated. The material leaving the heating apparatus at a temperature of 80 degrees and more is conveyed—no atmosuheric air being admitted—to said cooling receptacle where it is suddenly cooled down by 80 degrees centigrade and more under vacuum and under constant agitation.

In the drawing a device for carrying out the process described is shown in elevation.

It consists of a dryer $a$, which in the present case is constructed as a cylindric dryer with rotary drums, to which the material is fed at $b$. Beneath said dryer is disposed a similarly constructed sterilizer $c$ which at $d$ receives the material dried in the dryer $a$. Beneath the sterilizer again there is a cooler $e$ arranged, to receive the sterilized material at $f$. At $g$ the cooled material is withdrawn.

The dryer $a$, and sterilizer $c$ as well as the cooler $e$ are provided inside with agitating fans or screw conveyers or the like respectively, which are driven by pulleys $a'$ $c'$ $e'$. Besides, each apparatus is provided with a feeding or conveying device $a^3$ $c^3$ $e^3$ respectively, driven by shafts $a^2$ $c^2$ $e^2$ of the pulleys $a'$ $c'$ $e'$. Another conveyer $h$ passes the cooled material to the exit $g$.

I claim:

In a process for sterilizing flour or grit made from cereals and simultaneously increasing its baking capacity, the combination of drying the flour or the like under exclusion of atmospheric air and under constant agitation in a known manner under vacuum at a temperature of about 45° centigrade, then heating the flour to about 80 degrees centigrade and more, and subsequently subjecting it likewise under vacuum to rapid and strong cooling.

In testimony that I claim the foregoing as my invention I have signed my name to this specification.

KARL DIENST.